S. O. HOFFMAN.
METHOD OF AND APPARATUS FOR DETECTING AND OBSERVING OBJECTS IN THE DARK.
APPLICATION FILED APR. 8, 1919.

1,343,393.

Patented June 15, 1920.
4 SHEETS—SHEET 1.

WITNESS
J. H. Morgan

INVENTOR
S. O. Hoffman.
BY White & Pint
his ATTORNEYS

S. O. HOFFMAN.
METHOD OF AND APPARATUS FOR DETECTING AND OBSERVING OBJECTS IN THE DARK.
APPLICATION FILED APR. 8, 1919.
1,343,393.
Patented June 15, 1920.
4 SHEETS—SHEET 2.
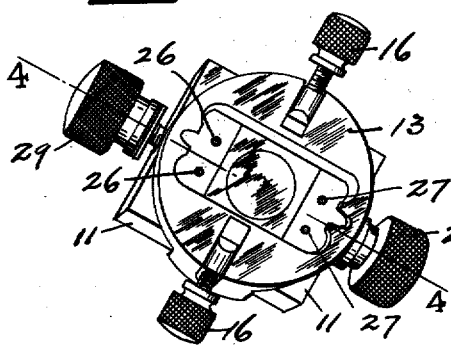
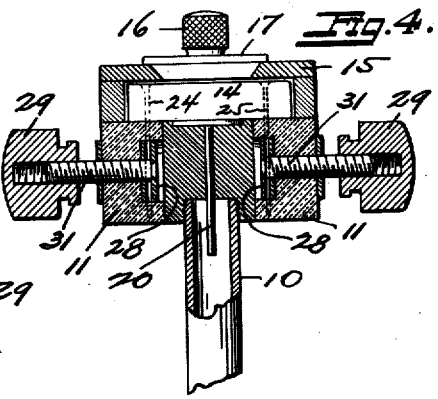
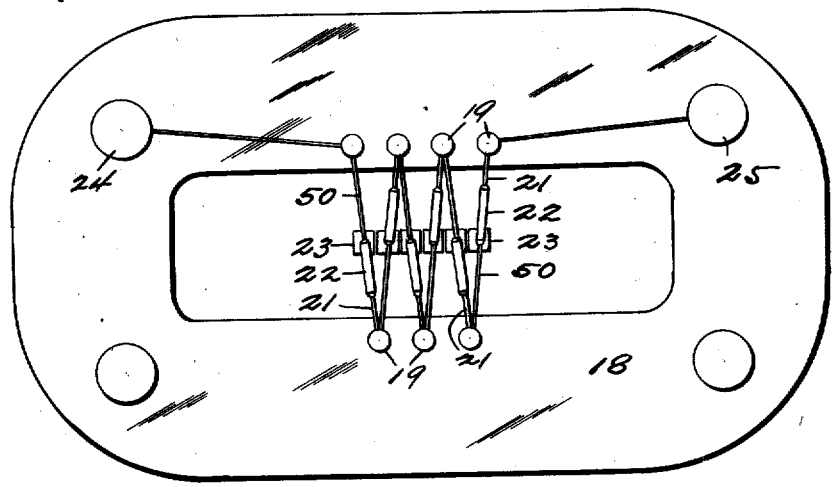
WITNESS
INVENTOR
S. O. Hoffman
BY
his ATTORNEYS

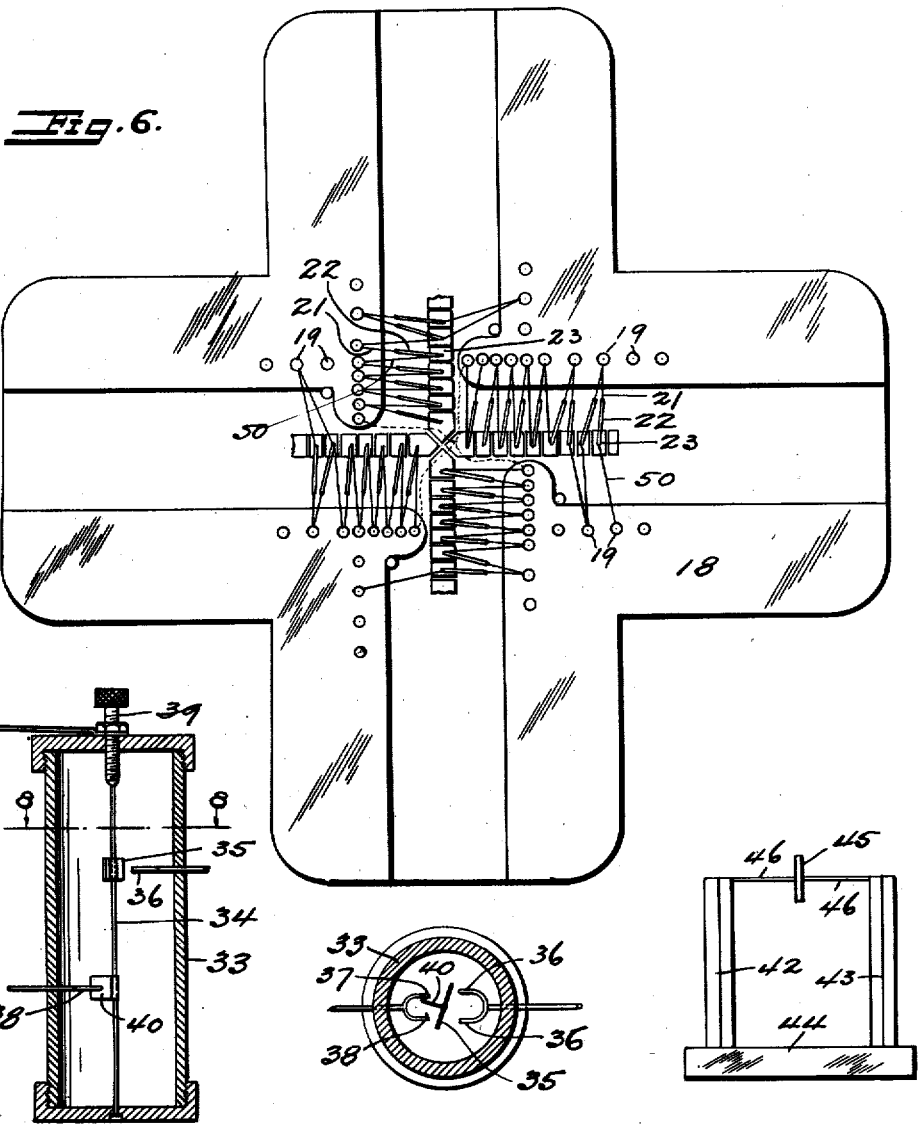

S. O. HOFFMAN.
METHOD OF AND APPARATUS FOR DETECTING AND OBSERVING OBJECTS IN THE DARK.
APPLICATION FILED APR. 8, 1919.
1,343,393.
Patented June 15, 1920.
4 SHEETS—SHEET 4.
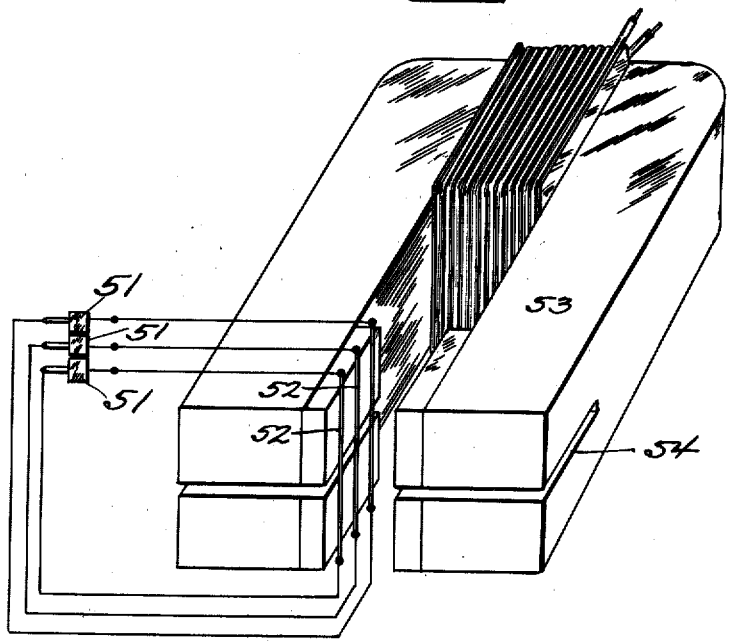
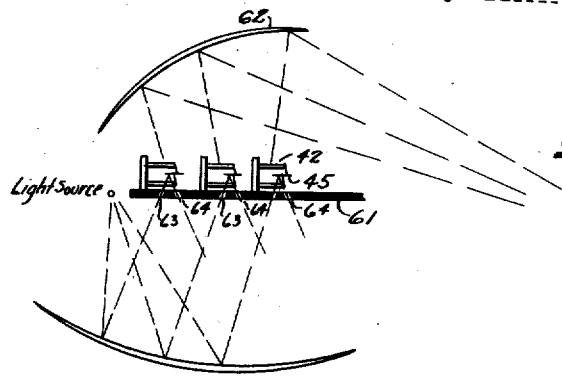
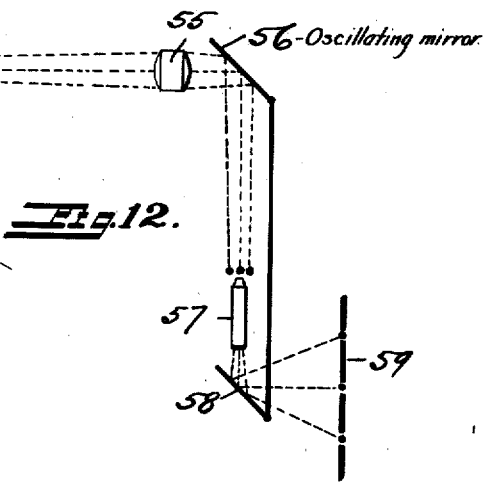
WITNESS
J.H.Morgan
INVENTOR
S. O. Hoffman.
BY
White & Prost
his ATTORNEYS

UNITED STATES PATENT OFFICE.

SAMUEL O. HOFFMAN, OF SAN FRANCISCO, CALIFORNIA, ASSIGNOR OF ONE-THIRD TO ALBERT ABRAMS, OF SAN FRANCISCO, CALIFORNIA.

METHOD OF AND APPARATUS FOR DETECTING AND OBSERVING OBJECTS IN THE DARK.

1,343,393.  Specification of Letters Patent.  Patented June 15, 1920.

Application filed April 8, 1919. Serial No. 288,635.

*To all whom it may concern:*

Be it known that I, SAMUEL O. HOFFMAN, a citizen of the United States, and a resident of the city and county of San Francisco, State of California, have invented a certain new and useful Method of and Apparatus for Detecting and Observing Objects in the Dark, of which the following is a specification.

The invention relates to a method of and an apparatus for detecting and observing objects in the dark, and for detecting the presence of invisible objects by day.

The invention has for its object the detection and observation of objects in the dark and renders possible the detection and observation in the dark of any object of a higher or lower temperature than its background, such as men, guns, ship funnels, icebergs, etc. and in addition on cloudless nights, the detection and observation of objects of the same temperature as their background, but of a different radiation emission power, that is, objects of a different color than their background. My device makes use of the long wave-length infra red radiation, which is emitted in varying quantity by all bodies at ordinary temperatures in the dark as well as in the light. The amount of this radiation emitted by various bodies depends chiefly on their temperature and to a less extent on their radiation emission power or colors. Hereafter in this specification, this long wave-length temperature radiation will be referred to as thermal radiation.

The invention possesses other advantageous features, some of which, with the foregoing, will be set forth at length in the following description where I shall outline in full, that particular form of the apparatus of my invention which I have selected for illustration in the drawings accompanying and forming part of the present specification. In said drawings I have shown one specific form of the apparatus of my invention, but it is to be understood that I do not limit myself to such form, since the invention, as expressed in the claims, may be embodied in a plurality of forms.

Referring to said drawings:

Fig. 3 is a perspective view of the thermopile mount, the cover being removed to disclose the interior.

Fig. 4 is a cross section of the assembled mount with the thermopile therein.

Fig. 5 is a greatly enlarged plan view of one type of thermopile.

Fig. 6 is a greatly enlarged plan view of a modified type of thermopile.

Fig. 7 is an elevation of one form of circuit interrupter for use with my apparatus.

Fig. 8 is a section through the interrupter on the line 8—8 of Fig. 7.

Fig. 9 is a side elevation of a thermal expansion unit.

Fig. 10 is a plan view of the thermal expansion unit.

Fig. 11 is a diagrammatic representation of one form of apparatus for observing the image formed on a plurality of thermocouples.

Fig. 12 is a diagrammatic representation of an optical system used in connection with the apparatus shown in Fig. 11.

Fig. 13 is a diagrammatic representation of one form of apparatus for observing the expansion of thermal expansion units.

Figure 1:
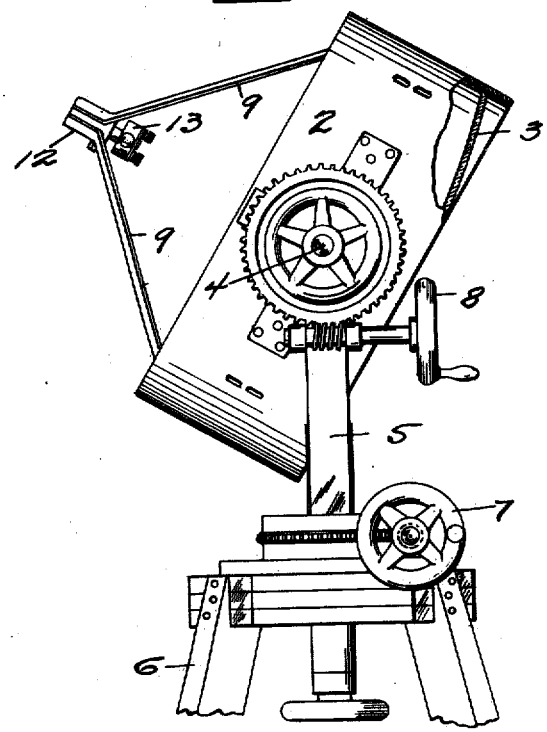
Figure 1 is a side view of the apparatus of my invention.
Figure 2:
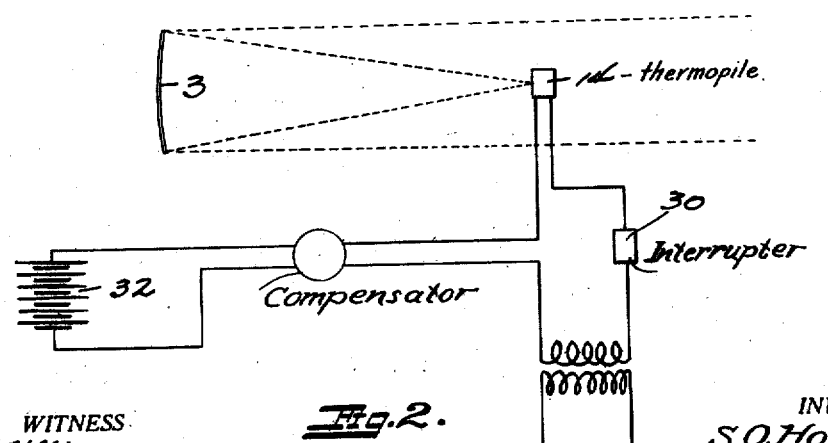
Fig. 2 is a diagrammatic representation of one form of detecting circuit used in conjunction with my apparatus.

In accordance with my invention I concentrate the thermal radiation from a body or form an image of the body in dark radiation on a thermo-sensitive surface, such as a thermopile or group of thermal expansion units and translate the effect of such radiation or image into some physical manifestation that is capable of being observed or noted by one of the senses, preferably by sight.

One form of the apparatus of my invention comprises a suitable casing 2 within which is arranged a parabolic mirror 3. The casing is provided with horizontal shafts 4, journaled in the yoke 5, which is mounted upon a suitable base 6 in such manner that it may be readily oriented, as by the hand wheel 7. The shafts 4 are also suitably connected to a hand wheel 8 so that the casing may be moved in a vertical arc. Secured to the casing by the arms 9, and disposed in front of the mirror 3 is a head 12, in which is secured the mount 13 of the thermopile 14. The head is so positioned, that when the mount is secured thereto, the thermopile lies at the focus of the mirror, so that an image in dark radiation of the object at which the mirror is sighted, is formed on the thermopile. The head is provided with a socket, into which a projection on the mount extends and in which the extension is clamped by suitable means.

The average wave length of the thermal radiation utilized in the method of my invention is about ten times the average wave length of light and obeys the laws of reflection and refraction that apply to visible radiation. The absorbing power of most transparent substances for this thermal radiation is so great that the use of transparent substances is precluded, except in very thin plates and therefore I prefer to use a mirror rather than a lens for concentrating the radiation or for forming an image of the object on the thermopile or other temperature sensitive surface.

The mount 13 is of rugged metallic construction and is provided with a cavity in which the thermopile is disposed. The cavity is closed by a cover plate 15, which is clamped thereto by suitable means such as the clamp screws 16, so that the thermopile chamber is air tight. The cover is provided centrally with a slot which is covered by a rock-salt plate 17, which is transparent to these radiations. This prevents all air and drafts from reaching the thermopile. The rock-salt plate is protected from the action of moisture by a very thin coat of asphaltum varnish. The mount is also provided with a thermopile ejection plunger 20 which extends into the removable stem or projection 10. Secured to the metallic portion of the mount are blocks of insulation 11 in which the electric terminals are arranged.

The thermopile of my invention comprises a base 18, preferably made of ivory, upon which are arranged a plurality of bismuth-silver thermocouples. The base 18 is provided with an aperture and fixed therein on both sides of the aperture are rows of pegs 19, preferably formed of copper. The thermocouples consist of complete strands or lengths of bismuth wire and silver wire welded together at their juncture and having a very small piece of silver foil welded to the juncture. Welded to a peg 19 on one side is a short piece of silver wire 21 less than 2 mm. in length and welded to that is a short length of bismuth wire 22, the silver wire 21 being used because a bismuth-copper weld is brittle and will not withstand vibration. Welded to the bismuth wire at its end, is a piece of silver wire 50 which at its other end is welded to the copper post on the other side of the aperture. To this second copper post is welded the silver end 21 of another bismuth-silver thermocouple provided at its center with a piece of silver foil 23. This construction is repeated a plurality of times, producing a series of pieces of silver foil arranged in line, but each separated from and air insulated from the adjacent pieces of foil. This produces a plurality of sensitive thermocouples connected together in series. The wires of each thermocouple are of such length that they sag slightly, thereby providing for variations in length due to temperature changes.

For quick acting thermopiles, the bismuth wire is preferably 0.07 mm. in diameter, the silver wire 0.025 mm. in diameter and the silver foil one-half mm. square and 0.02 mm. thick. The pile reaches its steady temperature in less than one second. The ends of the thermopile are connected to the metallic preferably copper posts 24—25 which extend from the base 18 and which are insertible into the sockets 26—27 in the mount. A clamp bar 28 provided with a screw portion 31 which is provided with a thumb nut 29 is arranged at each side of the mount for clamping the posts in position. The screw 31 also acts as a binding post for connecting the lead wires to the mount, the screwing of the nuts serving both to clamp the posts and the lead wires.

The current generated in the thermopile by the action of the thermal radiation thereon may be detected with a galvanometer, which is preferably of the ordinary high sensitivity, low resistance, moving coil type, having a period of one second. This type of instrument is advantageous for use when a portable instrument is desired for use in trenches and in other military operations. In actual use on directing the mirror toward a suspected spot, the background will as a rule be of different temperature than the receiving surface of the thermopile and this will result in a permanent galvanometer deflection. A potentiometer compensating arrangement is therefore used whereby an adjustable small current from a battery 32 can be sent through the galvanometer opposing the current from the thermopile and thus keeping the galvanometer spot at the center of the scale independent of the temperature of the background.

When portability of the instrument is not required, such as in installation on shipboard, the galvanometer may be dispensed with and the direct current from the thermopile converted into a pulsating current, which may be readily amplified in a vacuum tube or electron relay. The amplified current is then passed through telephone receivers, producing audible reception. Considerable care is necessary in the selection of the device or "chopper" for converting the direct current into a pulsating current, so that induction and stray thermo-electric effects are avoided. In Figs. 7 and 8 I have shown a suitable form of "chopper" which consists essentially of an extremely light suspended system, tuned to vibrate at the frequency of highest audibility. The chopper 30 shown comprises a casing 33 having suspended therein a stretched wire 34 to which is secured a copper vane 35 which is caused to vibrate by minute streams of air issuing from the nozzles 36. Secured to the wire below and spaced from the vane, so that its motion will be less than that of the vane, is a contact piece 40, preferably of copper, which is moved by the oscillating vane, to make contact alternately with the two contacts 37—38, preferably of copper, connected to one wire of the circuit. The other wire of the circuit is connected to the adjusting screw 39. Care must be exercised to have no dissimilar metals in contact in the circuit to generate stray thermo-electric currents and to have no rubbing contacts or rapidly moving dielectrics. It is advantageous also to insert a small transformer between the amplifier and the interrupter 30.

The thermopile shown in Fig. 5 is useful where the instrument is to be traversed in one plane only, such as for locating raiding parties from the trenches and for other purposes, but when the instrument is to be traversed in two planes, that is, the vertical and the horizontal, for detecting and locating airplanes or other objects in the air, the form of thermopile shown in Fig. 6 is advantageous. In this arrangement, two separate thermopiles are employed, the receiving surfaces being preferably disposed at right angles to each other. The silver foil surfaces are all air insulated from each other and the two thermopiles are insulated from each other. Each thermopile is connected to a separate galvanometer and when deflection of both galvanometers is obtained it is evidence of the formation of the image at the intersection of the thermopiles, indicating that the axis of the mirror is on the object sought. The opening in the thermopile mount is shaped to correspond to the shape of the thermopile so that the radiation may reach both surfaces. Scales are provided on the mirror mount so that the exact direction of the object may be read.

The apparatus heretofore described will detect and locate an object, but will not produce an image thereof. When it is desirable to obtain a more or less clearly defined image of the object, I use what I have termed an electro-mechanical retina to translate the energy image produced by the concave mirror, into a luminous image. To be of value in exhibiting detail, this retina should have from 1,000 to 10,000 units, each of which would translate the variations in radiant energy at its particular point in the image into a variation in light and produce an image of variable light and dark spots.

When a very rough outline of the object under observation is sufficient, a number of independent thermopiles distributed over the receiving surface in the focus of the mirror may be employed. Each thermopile or thermocouple 51 is separately connected to a fine metallic string 52 mounted between the poles of a powerful electro-magnet 53. The plurality of strings are arranged in parallel relation between the poles and a current or a variation in current in any string causes a very slight transverse movement of the string, each string being affected by the amount of energy present at the spot of the corresponding thermopile in the radiant image. The pole pieces of the electro-magnet 53 are provided with slots 54 through which the strings may be observed. The movement of the strings is so slight that it can be observed only with a microscope, and on account of the large number of strings, direct vision in this manner becomes impractical, if not impossible. In order to permit the movement of the strings to be observed, I have employed the optical system shown in Fig. 12. A beam of light is directed through the slots 54 and the lens 55, forming an image of the strings on the mirror 56. The mirror 56 oscillates, bringing the image of each string successively into the focus of the microscope 57. The microscope projects an enlarged image of the strings on the mirror 58 which is connected to and oscillates in time with the mirror 56 and from the mirror 58, the images are reflected on a screen 59. Since both mirrors oscillate in synchronism and to the same degree, the image of a string on the screen will move only when a string moves and no movement of an image is effected by the movement of the mirrors. The screen is preferably provided on its surface with contiguous light and dark lines and the images of the strings normally fall on the light lines, making such portion dark. When a string moves, the image moves onto a dark portion of the screen, exposing the white line, thereby accentuating the visibility of the movement of the strings.

When detail is required, a large number of radiation sensitive units must be used and very compact units must be chosen. I may use the radiometer, the radiomicrometer or a simple expansion unit. The radiometer and radiomicrometer are the same, except for their minute dimensions, as the well-known laboratory instruments. One form of thermal expansion unit is shown more or less diagrammatically in Figs. 9 and 10 and consists of two bi-metallic strips 42—43, each strip being formed of materials respectively of high and low thermal expansion, the strips being secured to a suitable base 44 at one end. Mounted between the free ends of the strips 42—43 is a small mirror 45, secured to the strips by fine wires 46. These wires are attached to the opposite faces of the mirror at offset points, so that variations in the tension of the wires due to movement of one strip with respect to the other, cause a slight rotation of the mirror. One of the strips is exposed to the radiant energy and both are affected equally by changes in room temperature, so that the mirror is moved only by the radiations. A plurality of such units are assembled in close relation and light is reflected from the mirrors, and the different angular positions of the mirrors with respect to the source of light and the point of observation, produces a field of light and dark spots corresponding to the image in thermal radiation, thereby producing a visible image.

In Fig. 13 I have shown one form of observing system employing a plurality of thermal expansion units. A plurality of units, which are individually very small, are assembled in close relation on a panel 61 and thermal radiation is concentrated on one of the strips 42, by the mirror 62. The panel is provided with apertures 63 through which a light beam is thrown onto the mirrors 45 and the reflected beams from the mirrors normally pass through other apertures 64 in the panel. When the mirrors are deflected, the reflected beam will not pass through the aperture, and by observing all of the apertures 64 the image may be observed. The units are very small and may be as small as one-eighth of an inch in length and they are grouped closely, so that the apertures 64 are placed close together.

I claim:

1. The method of detecting the presence of a body which consists in concentrating thermal radiation from the body on a thermo-sensitive body and translating the effect of the radiation on said thermo-sensitive body into movement of a light ray.

2. The method of detecting the presence of a body which consists in forming an image of the body in thermal radiation upon a thermo-sensitive body and translating the effect of the radiated image on said thermo-sensitive body into an image that may be observed by one of the senses.

3. The method of producing a visible image of a body in the dark which consists in forming an image of the body in thermal radiation on a thermo-sensitive body and translating the effect of such image on said thermo-sensitive body into a visible image.

4. An apparatus of the character described, comprising a thermo-sensitive body movable in response to thermal radiation, means for producing an image in thermal radiation on said body, whereby movement is produced in the thermo-sensitive body and means for rendering said movement observable.

5. An apparatus of the character described, comprising a thermo-sensitive body movable in response to thermal radiation, a parabolic mirror arranged for concentrating thermal radiation on said body whereby movement is produced in said body and means for rendering said movement observable.

6. In an apparatus of the character described, a plurality of thermal expansion units, means for concentrating thermal radiation from a body on a plurality of said units and means for observing the thermal expansion of said units.

7. In an apparatus of the character described, a plurality of thermal expansion units, means for concentrating thermal radiation from a body on a plurality of said units, a mirror attached to each unit and adapted to be moved thereby, and means for observing the movement of the mirrors.

8. In an apparatus of the character described, a plurality of thermal expansion units, means for concentrating thermal radiation from a body on said units, a mirror attached to each unit and adapted to be moved thereby, and means for throwing a light ray onto said mirrors whereby the movement of the mirrors may be observed.

9. In an apparatus of the character described, a plurality of thermo-sensitive units, means for concentrating thermal radiation from a body on said units and a movable observable element attached to each unit.

10. In an apparatus of the character described, a plurality of thermo-sensitive units adapted to produce movement when subjected to temperature changes, means for concentrating thermal radiation from a body on said units and movable reflecting elements secured to said units.

11. In an apparatus of the character described, a thermal expansion unit adapted to be moved by variations in temperature and a mirror secured to said unit and arranged to be moved by said movement.

12. In an apparatus of the character described, a thermal expansion unit, comprising two bi-metallic strips, and a mirror connected at spaced points to said strips.

In testimony whereof, I have hereunto set my hand at San Francisco, California, this 31st day of March, 1919.

SAMUEL O. HOFFMAN.

In presence of—
HUBERT G. PROST.